2,979,661
CIRCUIT ARRANGEMENT FOR COMPARING A PULSE WAVE WITH A PILOT WAVE

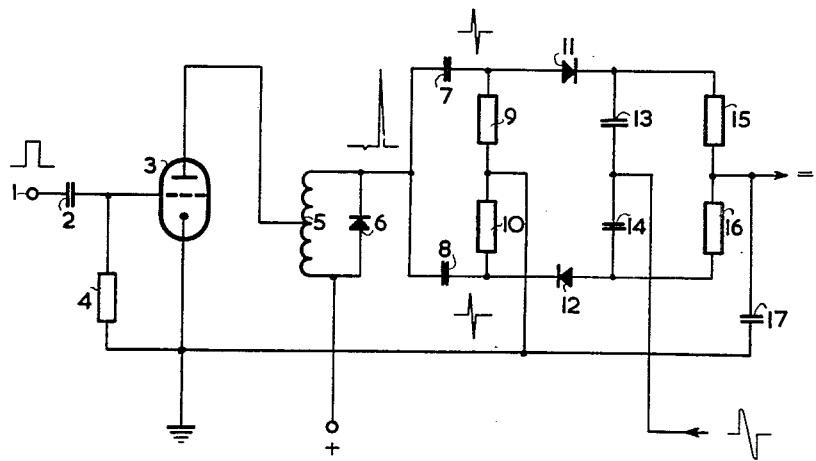

Robert Suhrmann, Hamburg-Rahlstedt, Germany, assignor to North American Philips Company, Inc., New York, N.Y., a corporation of Delaware Filed Nov. 12, 1957, Ser. No. 695,876

Claims priority, application Germany Dec. 15, 1956

3 Claims. (Cl. 328—133)

The present invention relates to a circuit arrangement for comparing a pulse with a control pulse having an edge decaying linearly between a positive and a negative value, in which two pulses of opposite phase, derived from said first pulse and the control pulse are supplied to a phase bridge delivering a regulating direct voltage depending upon the relative phase-displacement of said pulses and flattened by smoothing means.

The gating pulses of opposite phase, required for the phase bridge, may be taken from two winding halves of a transformer or from a phase-inverter stage, while the control is effected by means of a synchronization pulse or a pulse from a trigger circuit. However, the use of additional transformer windings or of a phase-inverter stage involves undue complication.

In a circuit arrangement of the type referred to in the preamble and used, for example, in television transmitting or receiving apparatus, simple means permit two gating pulses of opposite polarity to be obtained for controlling the phase bridge known per se by forming, by differentiation, in accordance with the invention, two oppositely directed gating pulses from said first pulse and by supplying these gating pulses jointly with the control pulse to the phase bridge.

The invention is based on the recognition that the oppositely directed pulses need not appear simultaneously.

As a matter of fact, there occurs in the phase bridge rectification of the sum of the control pulse and the positive gating pulse and of the sum of the control pulse and the negative gating pulse respectively so as to produce direct voltages which, upon variation of the phase position of the oscillations, vary in opposite sense, their difference yielding a regulating voltage which is preferably zero in the correct phase position and becomes positive or negative in the case of deviations.

Rectification—in practice tantamount to determining the peak value—of one voltage sum and of the other can, however, be effected independently of each other within given limits so as to produce two separated direct voltages from which the regulating direct voltage is obtained. However, this difference voltage is independent of the instant at which the phase-dependent direct voltages occur if, as customary, provision is made of smoothing means such as, for example, capacitors. Therefore, it is not necessary for the gating pulses to occur simultaneously with opposite polarity.

Preferably, two phase-dependent partial voltages are each individually applied to a storage element, for example a capacitor, and combined through decoupling elements, for example series-resistors, to form the phase-dependent regulating voltage. These decoupling elements prevent one partial voltage from adversely affecting the other partial voltage.

The charging time of the storage element, for example, a capacitor, is preferably short in comparison with the duration of the gating pulse, while the discharge time is long relative to the pulse period. As a result of the short charging time—which may slightly exceed the duration of the gating pulse—charging to the peak value of the voltage sum occurs rapidly. The long discharge time prevents the regulating direct voltage from varying considerably already during the interval between two pulses.

In order that the invention may be readily carried into effect, an example will now be described in detail with reference to the accompanying drawing.

A pulse signal, in the present case the synchronization signal, is supplied to a terminal 1 through a coupling capacitor 2 to the grid of an amplifying tube 3. This tube is represented as a triode but may alternatively be any other amplifying element, for example a pentode.

The cathode of the amplifying tube 3 is directly connected to ground while its grid is connected to ground through a leakage resistor 4. At the occurrence of grid current, the positive-going pulses applied at 1 or, as the case may be, the complete video-signal with positive-going pulse peaks, produce the required bias on the capacitor 2 so that the peaks of the pulses substantially have ground potential. In the output circuit of the tube 3 there occur current pulses corresponding to the driving synchronization pulses, which current pulses pass through part of an inductance coil 5 between the anode and the positive terminal of the supply.

As a result of the differentiating effect of said inductance 5, which may approximately be 0.5 mh., two oppositely directed spikes occur during the leading edge and the trailing edge of the piloting pulse at the inductance 5, the first (negative) spike being suppressed by a rectifier 6 connected in parallel with the inductance 5. The remaining positive spike is supplied through capacitors 7, 8 to resistors 9, 10, the other ends of which are connected to earth.

To the junction points of the capacitors 7, 8 and resistors 9, 10, the anode and the cathode of rectifiers 11, 12 are connected respectively, the opposite electrodes of which are connected to the series-combination of two capacitors 13, 14 and to the series-combination of two resistors 15, 16. It will be appreciated that the control pulse may alternatively be applied to the common junction point of the resistors 9, 10, the junction point of the capacitors 13, 14 then having to be connected to ground or at least to a point of fixed potential.

To the common point of the capacitors 13 and 14 there is applied a control pulse shaped approximately in the form of a cosine half cycle and may, for example, be obtained by differentiation of the fly-back pulse that may be taken from the line output transformer of the line time base. This control pulse has an edge declining linearly between a positive and a negative value.

By differentiation, a sharp positive and a directly succeeding substantially similar sharp negative gating pulse is produced from the positive pulse appearing at the inductance 5 by the R.C.-members 7, 9 and 8, 10 respectively with a very small time constant.

The diode 11 rectifies the sum of the positive gating pulse and the control pulse so that the voltage set up across the capacitor 13 corresponds to the peak value of the sum voltage of said components.

The diode 12 similarly rectifies the sum of the negative gating pulse and the control pulse so that also in this case the peak value of the last-mentioned sum voltage is set up at the capacitor 14. If the gating pulses occur accurately at both sides of the zero passage of the control pulse the voltages on the capacitors 13, 14 are equal. In the case of phase deviations from this zero point, the partial direct voltages alter in opposite sense. For example, the voltage on the capacitor 13 increases and that on the capacitor 14 decreases.

Through the decoupling resistors 15, 16 a regulating direct voltage is produced at the output of the phase bridge thus formed, which regulating voltage corresponds to the difference of the partial voltages and may, for example, be smoothed by means of a capacitor 17 and any further corresponding expedients.

It has been customary to supply to a phase bridge two separately produced pulses of accurately opposite phase, for example to resistors 9 and 10, but in accordance with the invention a signal pulse is used and by differentiation a double pulse is formed, the partial pulses of which occur at slightly different instants. Inasmuch as the time difference between the two pulses is small relative to the duration of the available regulating edge of the control pulse, the holding range is not reduced with the same regulating sensitivity. Otherwise, the operation of the circuit arrangement remains unchanged in spite of greater simplicity.

What is claimed is:

1. A phase-comparison circuit for comparing the phase of a first pulse with that of a control pulse having a linear slope, comprising two capacitors connected in a first series combination, means for applying said first pulse to the junction of said two capacitors, two resistors connected in a second series combination, said second series combination being connected in parallel with said first series combination, a source of reference potential connected to the junction of said two resistors, two additional capacitors connected in a third series combination, a first rectifier connected in a given polarity between an end of each of said second and third series combinations, a second rectifier connected in a polarity opposite to said given polarity between the remaining ends of said second and third series combinations, means for applying said control pulse to the junction of said two additional capacitors, two additional resistors connected in a fourth series combination, said fourth series combination being connected in parallel with said third series combination, and means connected to derive an output voltage from the junction of said two additional resistors, the capacitors and resistors of said first and second series combinations having values to cause differentiation of said first pulse.

2. A phase-comparison circuit for comparing the phase of a first pulse with that of a control pulse having a linear slope, comprising a tapped inductance, means for applying said first pulse to the tap on said inductance, a rectifier element connected in parallel with said inductance, two capacitors connected in a first series combination, means connecting an end of said inductance to the junction of said two capacitors, two resistors connected in a second series combination, said second series combination being connected in parallel with said first series combination, a source of reference potential connected to the junction of said two resistors, two additional capacitors connected in a third series combination, a first rectifier connected in a given polarity between an end of each of said second and third series combinations, a second rectifier connected in a polarity opposite to said given polarity between the remaining ends of said second and third series combinations, means for applying said control pulse to the junction of said two additional capacitors, two additional resistors connected in a fourth series combination, said fourth series combination being connected in parallel with said third series combination, and means connected to derive an output voltage from the junction of said two additional resistors, the capacitors and resistors of said first and second series combinations having values to cause differentiation of said first pulse.

3. A phase-comparison circuit for comparing the phase of a first pulse with that of a control pulse having a linear slope, comprising two capacitors connected in a first series combination, means for applying said first pulse to the junction of said two capacitors, two resistors connected in a second series combination, said second series combination being connected in parallel with said first series combination, a first rectifier connected with its anode to a first end of the parallel combination of said first and second series combination, a second rectifier connected with its cathode to the other end of said parallel combination, means for applying the said control pulse to both rectifiers, a smoothing network connecting the remaining ends of both rectifiers together and means connected to derive an output voltage from said smoothing network, the capacitors and resistors of said first and second series combination having values to cause differentiation of said first pulse.

References Cited in the file of this patent

UNITED STATES PATENTS

| | | |
|---|---|---|
| 2,497,840 | Seeley | Feb. 14, 1950 |
| 2,568,250 | O'Brien | Sept. 18, 1951 |
| 2,684,443 | Tidball | July 20, 1954 |
| 2,686,897 | Norton | Aug. 17, 1954 |
| 2,714,157 | Boelens | July 26, 1955 |
| 2,718,546 | Schlessinger | Sept. 20, 1955 |
| 2,736,859 | Pritchard et al. | Feb. 28, 1956 |
| 2,792,521 | Sziklai et al. | May 14, 1957 |
| 2,812,435 | Lyon | Nov. 5, 1957 |